Oct. 11, 1960 R. V. McGRATH 2,955,723
DOUBLE WALL PRESSURE VESSEL
Filed Nov. 8, 1954 4 Sheets-Sheet 1

Inventor:
Raymond V. McGrath,
By Merriam, Lorch,
Abbys.

Oct. 11, 1960 R. V. McGRATH 2,955,723
DOUBLE WALL PRESSURE VESSEL
Filed Nov. 8, 1954 4 Sheets-Sheet 2

Inventor:
Raymond V. McGrath,
By Merriam & Zorch,
Attys.

Oct. 11, 1960   R. V. McGRATH   2,955,723
DOUBLE WALL PRESSURE VESSEL
Filed Nov. 8, 1954   4 Sheets-Sheet 3

Inventor:
Raymond V. McGrath,
By Merriam, Lorch,
Attys.

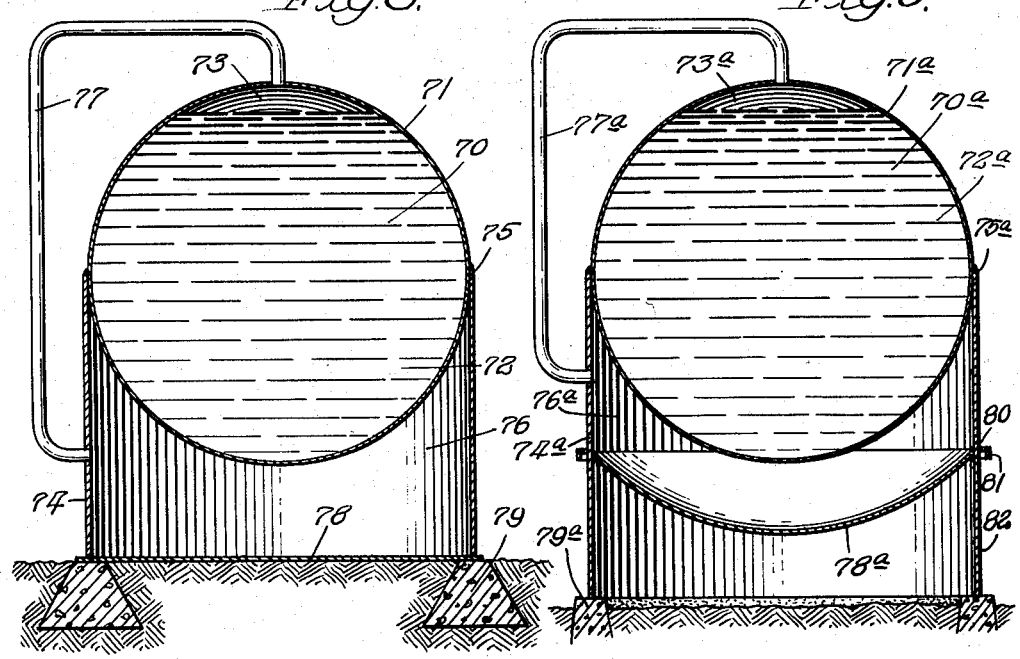

United States Patent Office 2,955,723
Patented Oct. 11, 1960

2,955,723

DOUBLE WALL PRESSURE VESSEL

Raymund V. McGrath, Merrionette Park, Ill., assignor to Chicago Bridge & Iron Company, a corporation of Illinois Filed Nov. 8, 1954, Ser. No. 467,458

6 Claims. (Cl. 220—20.5)

This invention relates to a double wall pressure vessel and more particularly to a steel pressure vessel having a liquid storage area above which is a gas pressure area.

In the storage of volatile liquids such as gasoline and the like, it is desirable to maintain a substantial pressure within the vessel. Where the vessels are tall or of large diameter, so that liquid is a substantial factor in the design of the vessel, the sum of the liquid pressure and of the gas pressure is frequently such as to require, either that the total be reduced or that the thickness of metal employed, particularly in the bottom portion of the vessel, be excessively great.

It is well known that as the thickness of steel increases, a point is reached at which costs rise with great rapidity. Among the factors affecting this increase of cost are the necessity of stress relief or radiography in the field above certain thicknesses, increase of welding costs and general difficulty of fabricating and handling the heavier plates.

According to my invention I provide an economical double walled vessel able to withstand a high total of liquid and gas pressure by having these pressures distributed between the two walls so that the thickness of either wall does not exceed the practical limits of shop fabrication and field assembly techniques, and a vessel in which stress relief or radiography may not be required, and in which the inner wall is of corrosion resistant metal such as stainless steel and the outer wall is of a less expensive metal such as carbon steel.

The requirement of stress relief is the most important factor in determining when the use of the present invention is of importance. Permissible thicknesses without stress relieving vary, depending upon the type or grade of metal, from 0 to 1.25 inches. For example, with some types of alloy steel, stress relief is required with thicknesses of 0.58 inch, while with usual low carbon steel, stress relief is required above 1.25 inches thickness. Thus, the invention is of great importance where the thickness of a single wall would be in excess of that which requires stress relief.

There are other factors which are also of importance including welding costs and the necessity of radiographing or X-raying the structure. Normally these factors come into play, or become excessive, only at greater thicknesses than that which requires stress relief. The double-walled vessel may be defined as having an inner wall enclosing a liquid area, and an outer wall surrounding at least a lower portion of the liquid area, preferably in communication with a gas pressure area above the liquid, but in any event having a balancing pressure to reduce the force bearing upon the lower portions of the inner wall.

The invention as illustrated in the drawings, in which:

Figure 8 is a sectional elevation of another modification of the invention;

Figure 9 is a sectional elevation of another modification of the invention; and

Figure 10 is a sectional elevation of another modification of the invention.

Figure 1:
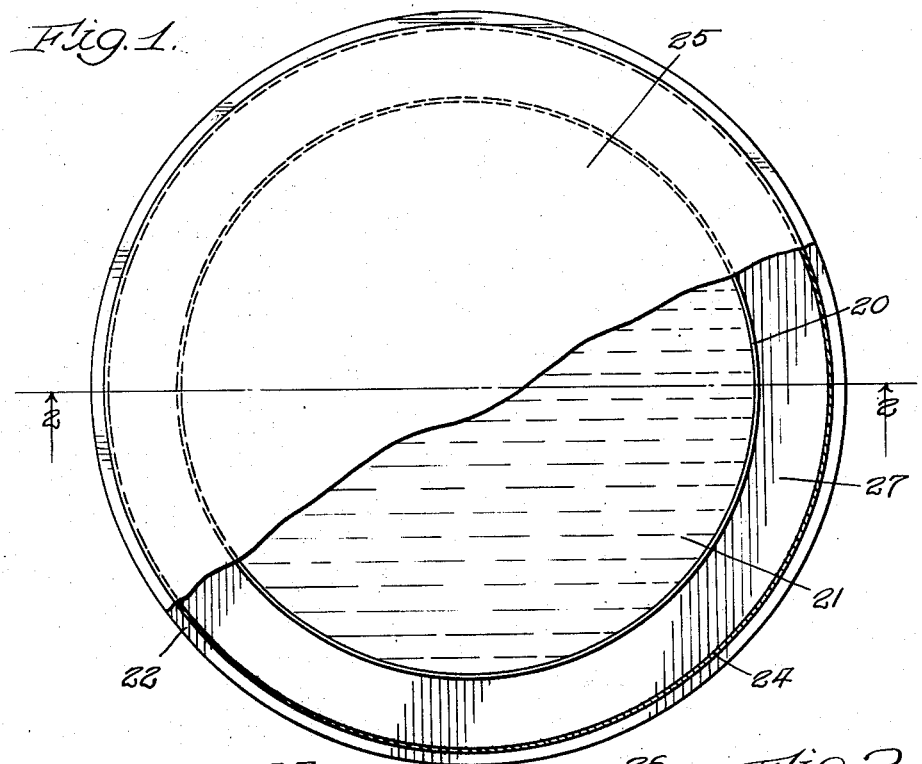
Figure 1 is a plan view partially in section of a sample form of the invention.
Figure 2:
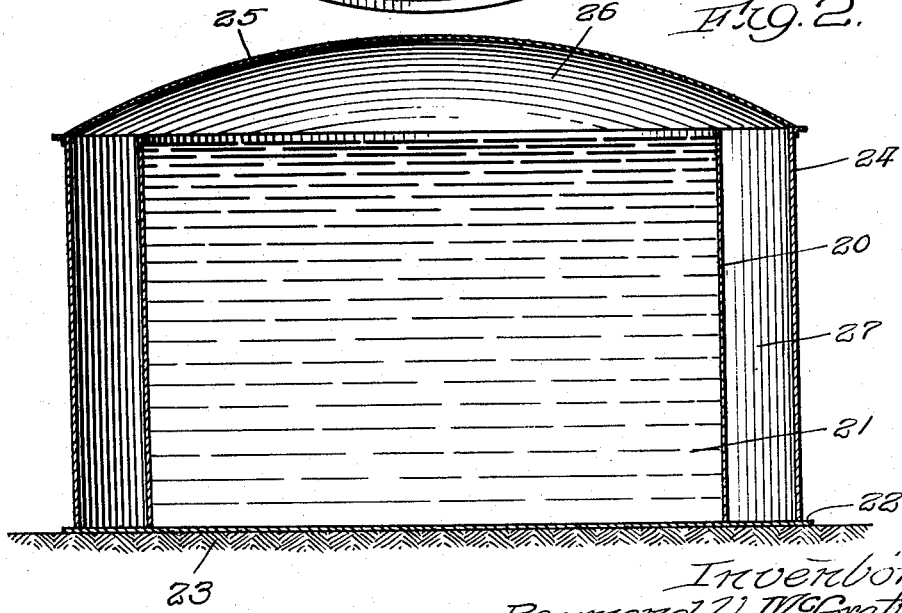
Figure 2 is a section taken along the line 2—2 in Figure 1.

In the embodiment shown in Figs. 1 and 2 the vessel has an outer side wall 24, a bottom wall 22, and a top wall 25, joined to provide a compartment. An inner side wall 20 joined to the bottom wall 22 forms an inner liquid storage portion for containing liquid 21. The remainder of the compartment comprises gas storage portions or chambers 26 and 27. The flat bottom wall 22 rests on a foundation 23. The outer wall 24 in this form is spaced from and surrounds the entire inner wall in a circumferential direction and for all or a portion of its height in a meridian direction and is also sealed to the common bottom wall. The gas pressure portion 26 is in communication with annular chamber 27 between the inner wall 20 and the outer wall 24.

It will be observed that the inner wall 20 need only be designed to withstand the liquid pressure since the gas pressure on the inside and the outside of the wall is identical. It is understood that the various walls are of metal such as steel, but that the inner and outer walls are not necessarily of the same composition.

Figure 3:
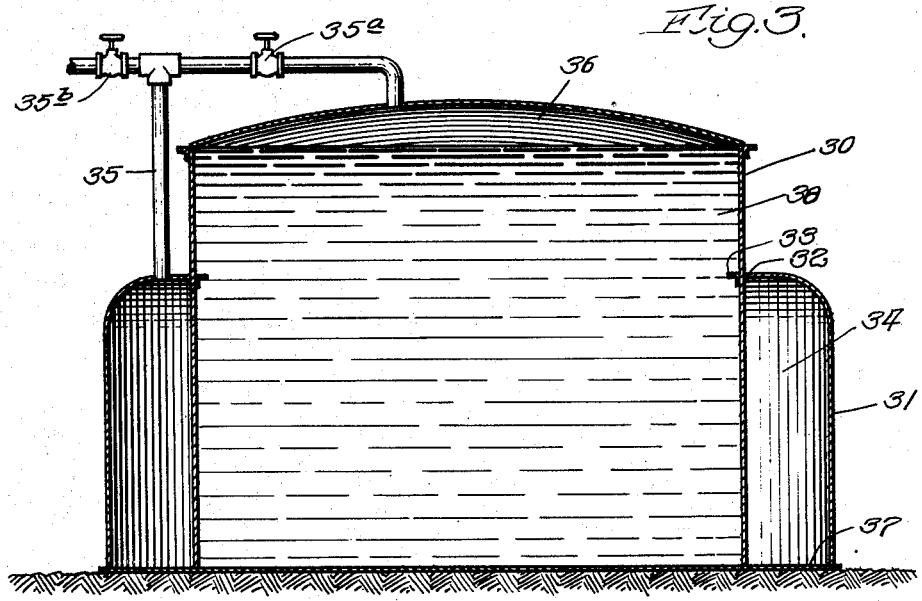
Figure 3 is a sectional elevation of a modified form of the invention.

In the form of the device shown in Figure 3, the outer wall 31 extends partially up the outside of the inside wall 30 and is closed at the top at the ring area 32 where it is reinforced by the ring girder 33, if structurally required, and is sealed to the inner wall 30 to define an annular gas pressure chamber 34. This latter chamber is in communication by means of pipe 35 with the gas pressure portion 36 above the liquid. In this case the vessel is shown with a flat bottom 37 common to the area under the liquid 38 and the gas chamber 34.

Figure 4:
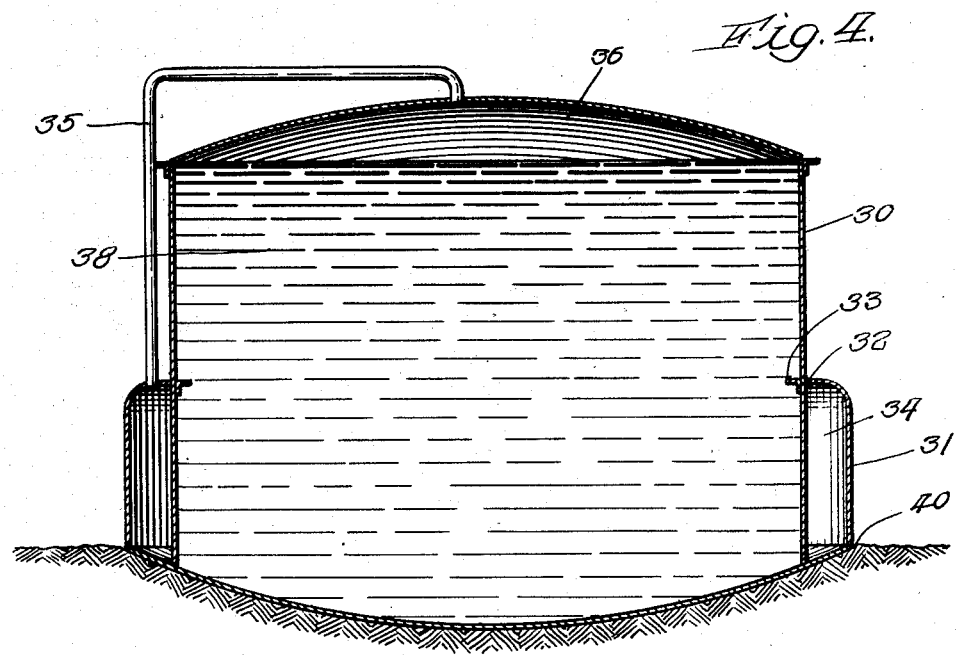
Figure 4 is a similar view of another form of the invention.

In the form shown in Figure 4, the structure is similar to that shown in Figure 3, except that a concave bottom 40 is supplied.

It should be understood that in the forms shown in Figures 3 and 4 as well as in the other forms of this device, the annular chamber between the inner and outer walls may be supplied in part with liquid to balance some of the pressure on the inner wall.

Figure 5:
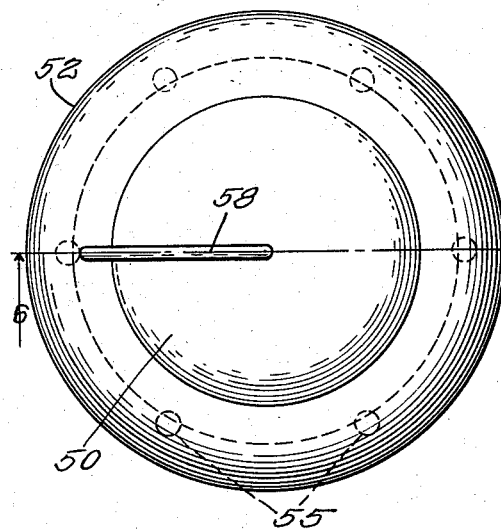
Figure 5 is a plan view of another form of the invention.
Figure 6:
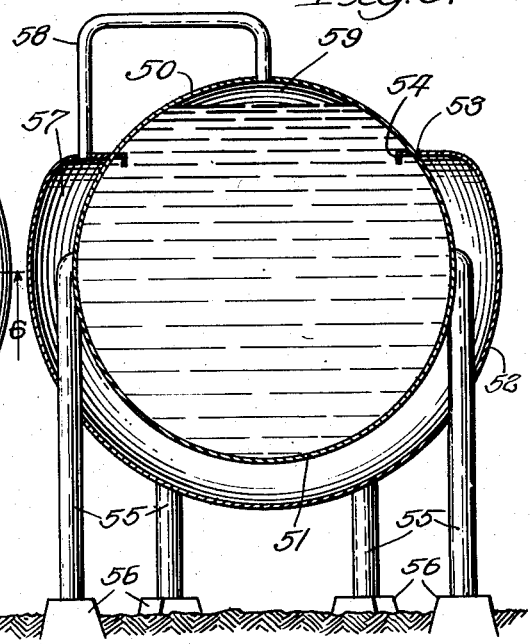
Figure 6 is a sectional elevation taken along the line 6—6 in Figure 5.

In the form of the device shown in Figures 5 and 6, the vessel 50 is spherical having an inner wall 51 which, due to its conformation includes a top and bottom, and the partial outer wall 52 which joins the shell at 53 where it is supported, if structurally required, by the ring girder 54. The sphere 50 is supported by columns 55 resting on supports 56. These supports, of course, pass through the outer wall 52 between the openings welded to provide gas and liquid tight connections. The chamber 57 between the walls 51 and 52 is in communication through the line 58 with the gas pressure portion 59 above the liquid. It should be understood that the form shown may be modified by using an outer wall of other than spherical shape, or by using a skirt support structure instead of columns.

Figure 7:
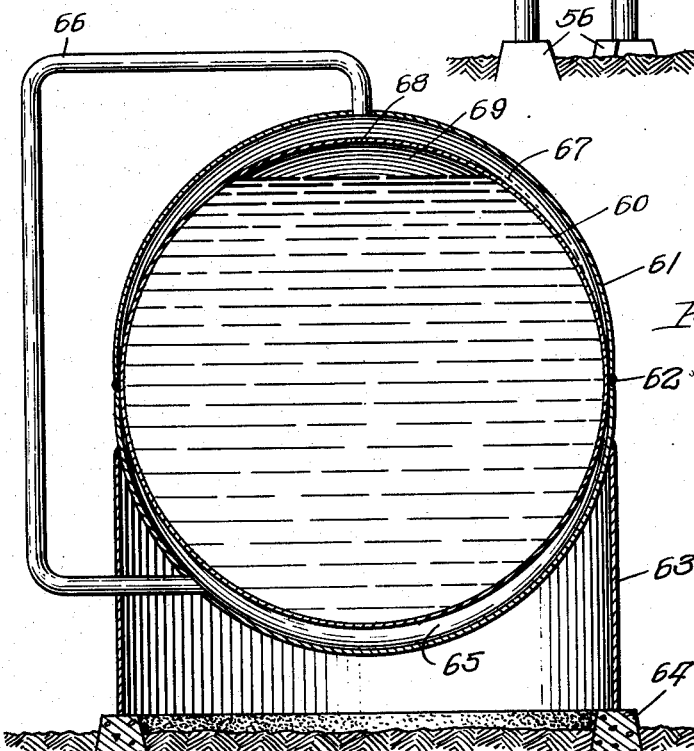
Figure 7 is a sectional elevation of another modification of the invention.

In the form shown in Figure 7, a further modification of the forms shown in Figures 5 and 6 is indicated in which the inner wall is spherical and outer wall is composed of portions of a sphere. The inner wall 60 is joined to the outer wall 61 by a horizontal circumferential weld 62. A skirt 63 supports the entire structure and is itself supported by piers 64 or other appropriate supports. Two pressure zones or chambers are found in this case between the inner and outer walls—a lower zone 65 which is in communication through the pipe line 66 with the upper pressure zone 67. This is in communication through the opening 68 with the interior of the inner sphere which has a third pressure zone 69.

It should be appreciated that in the various forms of the structure shown in Figures 3–10 inclusive the communication between the inner and outer pressure zones may be open or may be valved as at 35a (Fig. 3). In the latter case it may be desirable only to supply a restricted or a partial pressure to the outer zone. Furthermore, the pressure between the inner and outer walls may be introduced and maintained from some external source through valve 35b (Fig. 3) if desired. In the latter case it may be preferable to close valve 35a.

In the form of the device shown in Figure 8, a sphere 70 having an outer wall 71 defining a lower liquid portion 72 and an upper gas pressure chamber 73 is supported by a skirt 74 secured to the equator 75 of the sphere and appropriately reinforced.

This skirt 74 connects with a bottom 78 to define a pressure zone 76 surrounding the lower half of the sphere. The bottom 78 may be metal or other gas tight membrane which is secured to piers 79 which are designed to support the downward liquid load and to resist the uplift from the gas pressure forces.

The pressure zone 76 is in communication through the line 77 with the upper pressure chamber 73.

In the form shown in Figure 9, the sphere 70a has a wall 71a forming a liquid portion 72a and a gas pressure chamber 73a and is supported by a skirt 74a secured to the sphere in appropriate manner at 75a and thus defining a second bottom pressure chamber 76a which is in communication through the pipe line 77a with the top pressure chamber.

In this form the pressure chamber 76a is closed at the bottom by a bottom 78a which is secured at 80 to the skirt 74a reinforced by the ring girder 81, if structurally required. The lower portion 82 of the skirt is supported by the piers 79a, which in this case merely need to resist the downward force of the weight of the structure.

In the form shown in Figure 10, a spheroidal vessel 90 is shown which has an inner wall 91. This wall 91 defines bottom, sides and top of the inner vessel. A gas pressure chamber 92 is indicated at the top. The bottom, may, of course, be flat, coned, or curved in one or both directions. In those cases where it is necessary, any uplift may be resisted by reinforcing girders or anchor walls.

That portion of the inner wall 91 which is not in contact with the support is surrounded by a skirt 93 having an upwardly directed wall 94 and a substantially horizontal wall 95 resting upon the foundation and joined to the upward wall at 96. The bottom 95 may be flat or coned if desired with any uplift resisted by reinforcing girders or anchor walls. The chamber 97 between the skirt and the inner wall 91 is in communication through the pipe line 98 with the top pressure chamber. Liquid can be stored between the inner and outer shells if desired with the shells being designed for additional liquid pressure which is internal on the outer shell and bottom, but external on the inner shell. It should be understood that a sphere or other shape of vessel might also be employed in the manner shown in Figure 10.

The vent pipe 98 may connect to the inner shell below the top liquid capacity line which would allow liquid to fill the outer compartment. This would limit the internal liquid pressure on the inner shell and thus reduce the designed thickness.

Referring again to Figures 1 and 2, the chamber between the inner and outer shells depends upon practical considerations. The distance between shells may be practically zero, being only sufficient to permit passage of gas between the shells. A reduced head of liquid may be also carried by the inner and outer shells.

The bottom of the pressure shell may be anchored by a ring wall; it may be reinforced by means or trusses between the shells; it may be reinforced with the compression ring with the bottom coned or curved, and it may be weighted with liquid or solid between the shells to resist uplift.

The partial outer wall such as is shown in Figures 3–10 inclusive is primarily useful for structures where it it only necessary to reduce the lower portion of the inner wall in thickness.

The foregoing detailed description is given for clearness of understanding only, and no unnecessary limitations should be understood therefrom, for some modifications will be obvious to those skilled in the art.

I claim:

1. A closed, field-erected tank for the storage of large volumes of a normally volatile liquid which comprises walls forming an enclosed storage vessel, walls forming an enclosed outer annular chamber immediately adjacent said vessel surrounding the lower peripheral portion of said storage vessel in spaced relationship therewith, means for connecting the upper portion of said storage vessel with said chamber, said chamber having an outer sidewall with the inner sidewall thereof and the storage tank sidewall being common, the vertical height of said chamber being substantially less than the vertical height of the sidewall of said storage tank, the sidewalls of said storage vessel and said chamber being respectively constructed of welded metal plates having thicknesses sufficient to contain any liquid and vapor pressures exerted thereon under normal storage conditions but less than the thickness of metal plate requiring the stress relief of field welded joints and with the thickness of the sidewalls of said vessel being less than the plate thickness of a conventional single wall field storage tank designed for storing said volatile liquid having a capacity and configuration coincident with said enclosed storage vessel.

2. A closed, field-erected tank for the storage of large volumes of a normally volatile liquid which comprises walls forming an enclosed storage vessel, walls forming an enclosed outer annular chamber immediately adjacent said vessel surrounding the lower peripheral portion of said storage vessel in spaced relationship therewith, means for connecting the upper portion of said storage vessel with said chamber, said chamber having an outer sidewall with the inner sidewall thereof and the storage tank sidewall being common, the vertical side of said chamber being substantially less than the vertical height of the sidewall of said storage tank, the sidewalls of said storage vessel and said chamber being respectively constructed of welded metal plates having thicknesses sufficient to contain any liquid and vapor pressures exerted thereon under normal storage conditions but less than the thickness of metal plate requiring the stress relief of field welded joints and with the thickness of the sidewalls of said vessel being less than the plate thickness of a conventional single wall field storage tank designed for storing said volatile liquid having a capacity and configuration coincident with said enclosed storage vessel, and providing an upper gas storage portion therein containing volatilized portions of said liquid at a vapor pressure normal for the ambient atmosphere surrounding said tank whereby the interior of said chamber in contact with said storage vessel is at a pressure equal to that exerted in said upper gas storage portion.

3. A closed, field-erected tank for the storage of large volumes of a normally volatile liquid which comprises walls forming an enclosed storage vessel having a cylindrical upright sidewall, walls forming an enclosed outer annular chamber immediately adjacent said storage vessel having an upright sidewall surrounding the lower peripheral portion of said storage vessel in spaced relationship therewith forming an annular space about the surrounded portion of the storage vessel, means for connecting the upper portion of said storage vessel with the interior of said chamber, said chamber having an outer sidewall with the inner sidewall thereof and the storage tank sidewall being common, the vertical height of the said chamber being substantially less than the vertical height of the sidewall of said storage tank, the sidewalls of said storage vessel and said chamber being respectively constructed of welded metal plates having thicknesses sufficient to contain any liquid and vapor pressures exerted thereon under normal storage conditions but less than the thickness of metal plate requiring the stress relief of field welded joints and with the thickness of the sidewalls of said vessel being less than the plate thickness of a conventional single wall field storage tank designed for storing said volatile liquid having a capacity and configuration coincident with said enclosed storage vessel.

4. A closed, field-erected tank for the storage of large volumes of a normally volatile liquid which comprises walls forming an enclosed storage vessel, walls forming an enclosed outer annular chamber immediately adjacent said storage vessel having an upright sidewall surrounding the lower peripheral portion of said storage vessel in spaced relationship therewith forming an annular space about the surrounding portion of the storage vessel, means for connecting the upper portion of said storage vessel with the interior of said chamber, said chamber having an outer sidewall with the inner sidewall thereof and the storage vessel sidewall being common, the vertical height of said chamber being substantially less than the meridian height of the sidewall of said storage vessel, the sidewalls of said storage vessel and said chamber being respectively constructed of welded metal plates having thicknesses sufficient to contain any liquid and vapor pressures exerted thereon under normal storage conditions but less than the thickness of metal plate requiring the stress relief of field welded joints and with the thickness of the sidewalls of said vessel being less than the plate thickness of a conventional single wall field storage tank designed for storing said volatile liquid having a capacity and configuration coincident with said storage vessel.

5. A field-erected tank in accordance with claim 4 in which said storage vessel is supported in an elevated position by a suitable support structure.

6. A field-erected tank in accordance with claim 5 in which said enclosed outer annular chamber is employed as said support structure for said storage vessel.

References Cited in the file of this patent

UNITED STATES PATENTS

| | | |
|---|---|---|
| 1,755,017 | Nerre | Apr. 15, 1930 |
| 1,757,583 | Novotny | May 6, 1930 |
| 2,220,146 | Curry | Nov. 5, 1940 |
| 2,347,070 | Austin | Apr. 18, 1944 |
| 2,389,246 | Davey | Nov. 20, 1945 |
| 2,627,184 | Jones | Feb. 3, 1953 |
| 2,683,950 | Gellenbeck | July 20, 1954 |
| 2,684,180 | Allen | July 20, 1954 |
| 2,690,273 | Arne | Sept. 28, 1954 |

FOREIGN PATENTS

| | | |
|---|---|---|
| 184,870 | Switzerland | Sept. 1, 1936 |

UNITED STATES PATENT OFFICE
CERTIFICATE OF CORRECTION

Patent No. 2,955,723　　　　　　　　　　　　　　　October 11, 1960

Raymund V. McGrath

It is hereby certified that error appears in the printed specification of the above numbered patent requiring correction and that the said Letters Patent should read as corrected below.

Column 4, line 35, for "joints and with the thickness" read -- joints, and the thickness --; line 38, after "liquid" insert -- and --; line 49, for "side" read -- height --.

Signed and sealed this 11th day of April 1961.

(SEAL)
Attest:

ERNEST W. SWIDER　　　　　　　　　　　　　　ARTHUR W. CROCKER
Attesting Officer　　　　　　　　　　　　　　　Acting Commissioner of Patents